United States Patent
Cartwright et al.

[11] Patent Number: 5,678,454
[45] Date of Patent: Oct. 21, 1997

[54] STEERING COLUMN

[75] Inventors: Mark A. Cartwright, Lafayette; Gary L. Vander Molen; Samuel G. Johnson, both of West Lafayette, all of Ind.

[73] Assignee: TRW Inc., Lyndhurst, Ohio

[21] Appl. No.: 490,721

[22] Filed: Jun. 15, 1995

[51] Int. Cl.⁶ .................................................... B62D 1/18
[52] U.S. Cl. ................................................ 74/493; 74/531
[58] Field of Search ...................... 74/493, 531; 188/67, 188/77 W

[56] References Cited

U.S. PATENT DOCUMENTS

| | | |
|---|---|---|
| 2,023,670 | 12/1935 | Douglas . |
| 3,302,478 | 2/1967 | Pauwels ................................. 74/493 |
| 3,955,439 | 5/1976 | Meyer . |
| 4,041,796 | 8/1977 | Shishido ............................... 74/493 |
| 4,179,137 | 12/1979 | Burke . |
| 4,240,305 | 12/1980 | Denaldi et al. . |
| 4,449,419 | 5/1984 | Bruguera . |
| 4,656,888 | 4/1987 | Schmitz ................................. 74/493 |
| 4,709,592 | 12/1987 | Andersson ............................ 74/493 |
| 4,774,851 | 10/1988 | Iwanami et al. ...................... 74/493 |
| 4,972,732 | 11/1990 | Venable et al. ....................... 74/493 |
| 5,088,767 | 2/1992 | Hoblingre et al. .................... 280/775 |
| 5,148,717 | 9/1992 | Yamaguchi . |
| 5,213,004 | 5/1993 | Hoglingre . |
| 5,265,492 | 11/1993 | Snell ..................................... 74/493 |
| 5,363,716 | 11/1994 | Budzik, Jr. et al. . |

*Primary Examiner*—David M. Fenstermacher
*Attorney, Agent, or Firm*—Tarolli, Sundheim, Covell, Tummino & Szabo

[57] ABSTRACT

A steering column (10) has a first steering column member (12) movable axially relative to a second steering column member (14). A support (68, 144) for connecting the steering column to a vehicle frame includes first and second clamping members (68, 144) at least partially circumscribing a member (58) connected to the first steering column member (12) for clamping the member (58) connected to the first steering column member (12) to lock the first steering column member (12) in any one of an infinite number of positions relative to the second steering column member (14). The first clamping member (68) is adapted to be connected to the vehicle frame. The second clamping member (144) has a first end portion (148) connected to the first clamping member (68) and a second end portion (142). A cam (122) engaging the second end portion (142) of the second clamping member (144) applies a clamping force to the second clamping member (144). The cam (122) has a first position in which the first steering column member (12) is prevented from moving relative to the second steering column member (14) and a second position in which the first steering column member (12) is permitted to move axially relative to the second steering column member (14).

29 Claims, 5 Drawing Sheets

STEERING COLUMN

BACKGROUND OF THE INVENTION

The present invention relates to a steering column, and more specifically to a tilt-telescope steering column.

A known steering column is disclosed in U.S. Pat. No. 4,449,419. U.S. Pat. No. 4,449,419 discloses a steering column in which a first steering column member can be adjusted to an infinite number of axial positions relative to a second steering column member and an input shaft can be positioned in any one of an infinite number of pivot positions relative to the first steering column member. A fastener is loosened to adjust the position of the first steering column member relative to the second steering column member and the input shaft relative to the first steering column member. The fastener is then tightened to hold the steering wheel in the adjusted position.

SUMMARY OF THE INVENTION

The steering column of the present invention includes first and second coaxial steering column members. The first steering column member is movable axially relative to the second steering column member. A support means for connecting the steering column to a vehicle frame includes first and second clamping members at least partially circumscribing a member connected to the first steering column member.

The first and second clamping members clamp the member connected to the first steering column member to lock the first steering column member in any one of an infinite number of axial positions relative to the second steering column member. The first clamping member is adapted to be connected to the vehicle frame. The second clamping member has a first end portion connected to the first clamping member and a second end portion.

A cam engages the second end portion of the second clamping member to apply a clamping force to the second clamping member. The cam has a first position in which the first and second clamping members clamp the member connected to the first steering column member to prevent movement of the first steering column member relative to the second steering column member. The cam has a second position in which the first and second clamping members release the member connected to the first steering column member to permit axial movement of the first steering column member relative to the second steering column member.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF THE PREFERRED EMBODIMENTS

Figure 1:
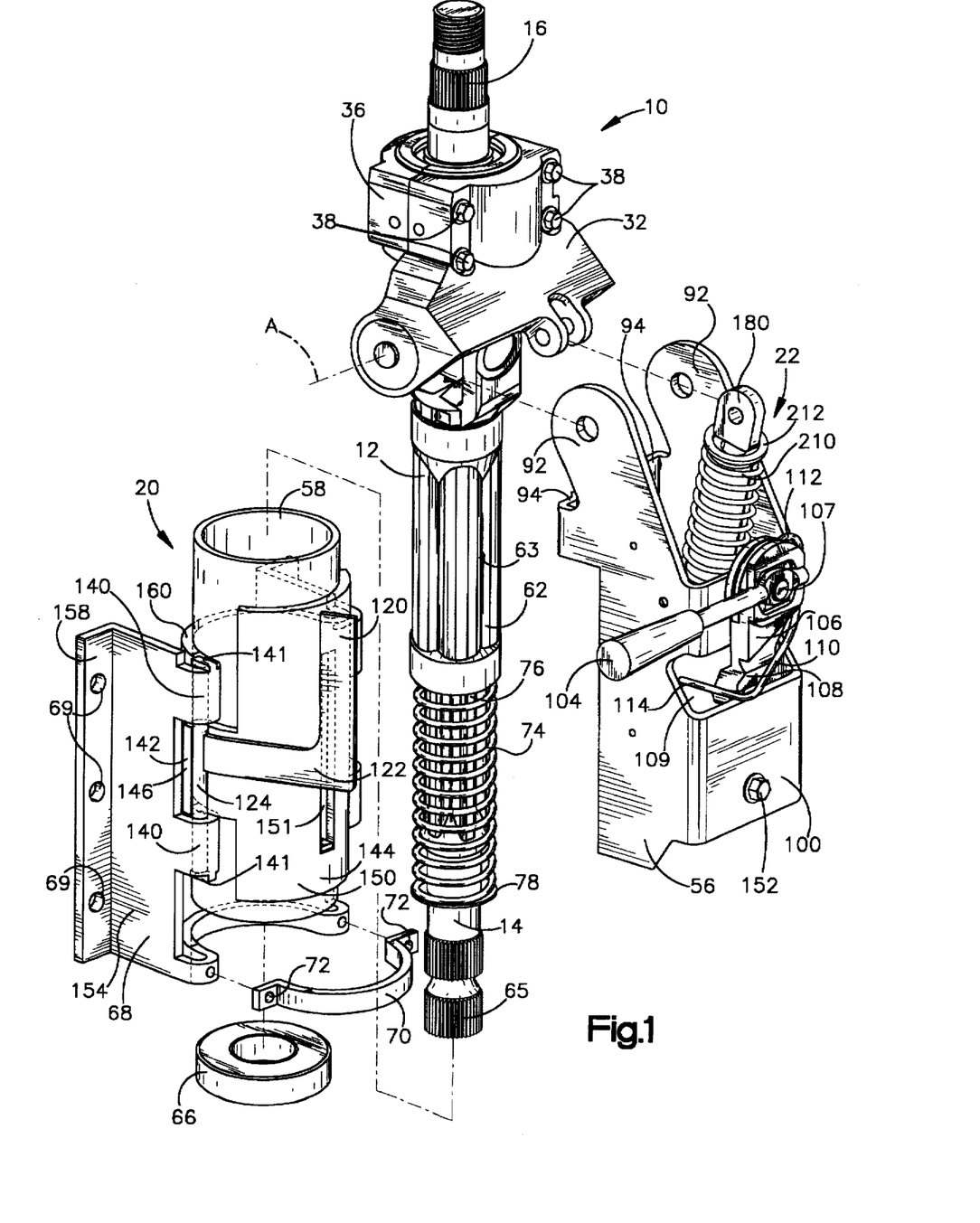
FIG. 1 is an exploded view of a steering column of the present invention.
Figure 2:
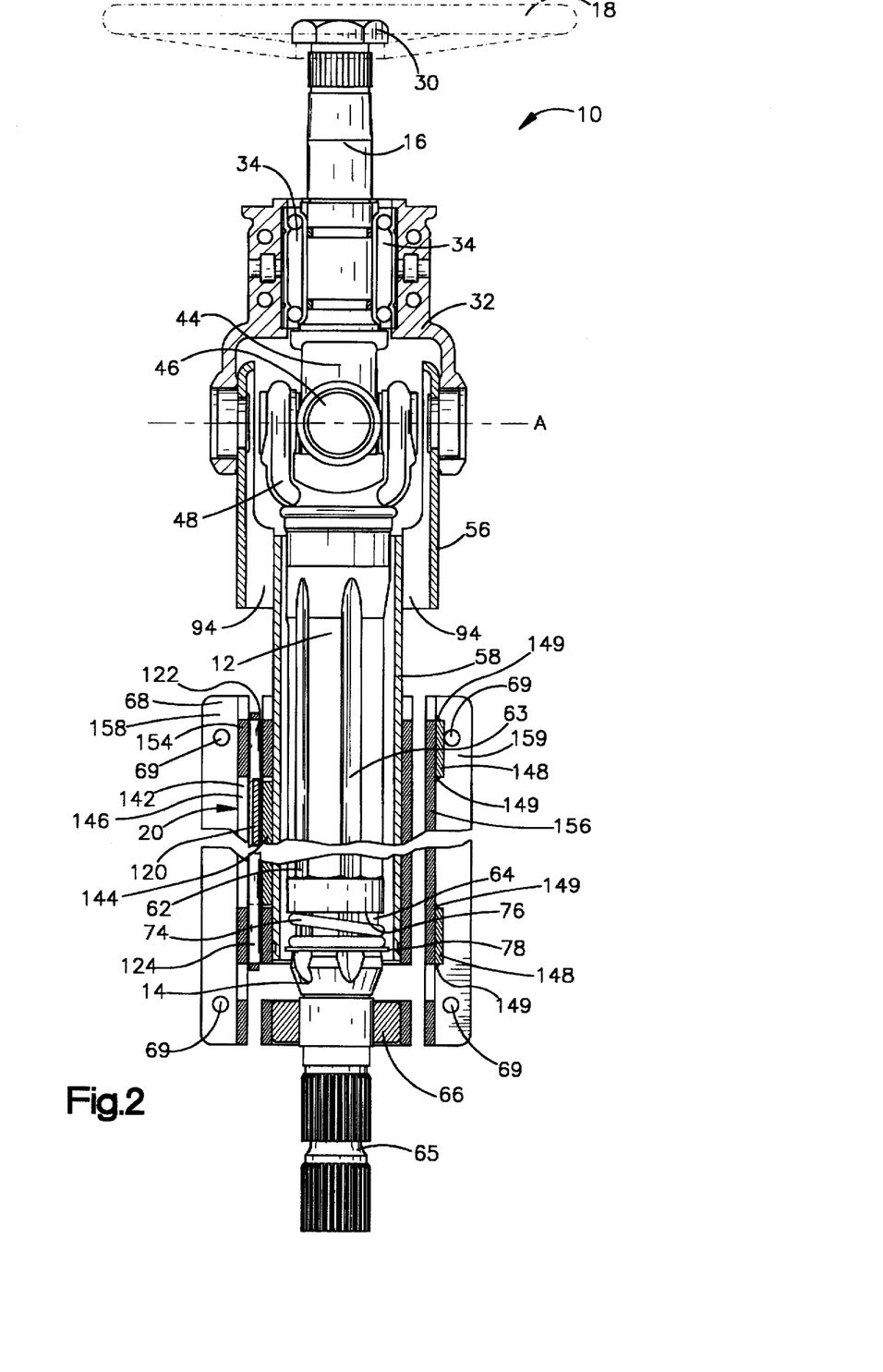
FIG. 2 is a sectional view of the steering column of FIG. 1.

The present invention comprises an axially and angularly adjustable vehicle steering column 10 (FIG. 1). The steering column 10 includes a pair of steering column members 12, 14 and an input shaft 16. A vehicle steering wheel 18 (FIG. 2) is attached to the input shaft 16 by a nut 30. The input shaft 16 and steering column members 12, 14 rotate upon rotation of the vehicle steering wheel 18. The steering column members 12, 14 telescope to effect axial adjustment of the steering wheel 18. The input shaft 16 is pivotable relative to the steering column member 12 to effect angular adjustment of the steering wheel 18.

A releasable telescope locking mechanism 20 (FIG. 1) locks the steering column members 12, 14 in any one of an infinite number of telescope positions. A releasable tilt-locking mechanism 22 locks the input shaft 16 in any one of an infinite number of pivot positions relative to the steering column member 12.

The input shaft 16 (FIG. 2) extends into an upper housing 32. Bearings 34 (shown schematically in FIG. 2) are located in the upper housing 32 and support the input shaft 16 for rotation relative to the upper housing 32. A cover 36 (FIG. 1) is connected to the upper housing 32 by screws 38. The cover 36 is removable from the upper housing 32 so that the bearings 34 may be reached for repair and maintenance.

The input shaft 16 is connected to a yoke 44 (FIG. 2) of a universal joint 46. Another yoke 48 of the universal joint 46 is connected to the steering column member 12. The input shaft 16 can pivot, relative to the steering column member 12, about a pivot axis A of the universal joint 46. From the above, it should be clear that upon rotation of the steering wheel 18, the input shaft 16 and steering column member 12 rotate.

The upper housing 32 (FIG. 1) is pivotally connected to a bracket 56 which is connected to the steering column member 12 by a jacket tube 58. The upper housing 32 is pivotable about the axis A relative to the bracket 56 and the jacket tube 58. Therefore, the upper housing 32 pivots along with the input shaft 16 relative to the bracket 56 and the steering column member 12.

The steering column member 14 extends into a lower tubular shaft portion 62 of the steering column member 12 (FIG. 1). The tubular shaft portion 62 has internal splines 63 (FIG. 3) thereon which mesh with external splines 64 on the steering column member 14. The splines 63 of the steering column member 12 mesh with the splines 64 of the steering column member 14 to effect rotation of the steering column member 14 upon rotation of the steering column member 12.

An axial end portion 65 (FIGS. 1 and 2) of the steering column member 14 is connectable to an output shaft (not shown). The output shaft is attached to a steering gear (not shown) of the vehicle. Steering column member 14 is supported by a bearing 66 for rotation relative to a support 68 which is connectable to a frame of the vehicle. The support 68 can be made by stamping. The support 68 has openings 69 for receiving fasteners, such as bolts (not shown), for connecting the steering column 10 to a vehicle frame.

A bearing strap 70 (FIG. 1) extends around the bearing 66 to connect the bearing to the support 68. The bearing strap 70 includes openings 72 for receiving fasteners, such as bolts (not shown), for connecting the bearing strap to the support 68. Upon rotation of the steering wheel 18, the input shaft 16 and the steering column members 12, 14 rotate and the rotational movement is transmitted to the output shaft to effect vehicle steering.

The steering column members 12, 14 may be moved axially (telescoped) relative to each other. A spring 74 (FIGS. 1 and 2) circumscribes the steering column member 14. The spring 74 acts between an axial end surface 76 of the steering column member 12 and a flange 78 connected to the steering column member 14. The spring 74 acts to bias the steering column member 12 in a vertical direction, as viewed in FIG. 1, relative to the steering column member 14.

The bracket 56 (FIG. 1) includes generally parallel side walls 92. Portions 94 extend radially inwardly from the side walls 92 and are connected to an upper portion of the jacket tube 58. A portion 100 of the bracket 56 extends between the side walls 92. The bracket 56 partially encloses the telescope locking mechanism 20 and the tilt locking mechanism 22.

A handle 104 and actuator member 106, connected to the handle, are pivotally mounted on the portion 100 of the bracket 56 by a pin 107. A portion 108 of the actuator member 106 extends into an opening 109 in the portion 100 of the bracket 56. A torsion spring 110 extends around the actuator member 106 to bias the handle 104 and the actuator member to an initial position in which the telescope locking mechanism 20 and the tilt locking mechanism 22 are locked. The handle 104, actuator member 106, and spring 110 move along with the bracket 56, the jacket tube 58, and the steering column member 12 relative to the steering column member 14.

An end 112 (FIG. 1) of the spring 110 engages the portion 100 of the bracket 56 and the other end 114 of the spring engages a paddle portion 120 (FIGS. 1 and 3) of a cam 122. The portion 108 of the actuator member 106 also engages the paddle portion 120. The cam 122 includes a longitudinally extending camming portion 124 (FIGS. 1 and 3) extending substantially parallel to the steering column member 14. The camming portion 124 of the cam 122 has an arcuate side surface 128 (FIG. 5) and a flat side wall 130. The arcuate side surface 128 and the flat side wall 130 intersect to form a longitudinally extending edge 132.

The portion 124 of the cam 122 engages semi-cylindrical portions 140 of the support 68. The portions 140 of the support 68 are spaced apart along the longitudinal axis of the longitudinally extending portion 124, see FIG. 1. Extensions 141 extend from the semi-cylindrical portions 140 and are bent to retain the camming portion 124 in the semi-cylindrical portions.

The portion 124 also engages an end portion 142 (FIG. 3) of a clamping member 144 so that the portion 124 of the cam 122 acts between portions 140 of the support 68 and the end portion 142 of the clamping member 144. The clamping member 144 can be made by stamping. The end portion 142 of the clamping member 144 extends between the portions 140 of the support 68.

The end portion 142 of the clamping member 144 has a radially extending lip 146 which engages the portion 124 of the cam 122. The clamping member 144 has another end portion 148 (FIG. 3) which is connected, such as by welds 149, to the support 68 so that the clamping member 144 can pivot relative to the support. The clamping member 144 includes an arcuate portion 150 extending between the end portions 142 and 148.

The clamping member 144 has a longitudinally extending slot 151 (FIG. 1). A bolt 152 extends through an opening in the portion 100 of the bracket 56, through the slot 151, and threadably engages the jacket tube 58. A sleeve 153 (FIG. 3) circumscribes the bolt 152 and extends between the portion 100 of the bracket 56 and the jacket tube 58. The axial ends of the slot 151 engage the sleeve 153 to define the limits of axial movement of the steering column member 12 relative to the steering column member 14. Also, the bolt 152 and sleeve 153 provide support for the bracket 56.

The support member 68 (FIGS. 1 and 3) includes a side wall 154 extending from the semi-cylindrical portions 140 and a side wall 156 to which the end portion 148 of the clamping member 144 is connected. Flanges 158 and 159 extend from side walls 154 and 156, respectively, and include openings 69 for connecting the support 68 to the vehicle frame. The support 68 (FIG. 3) includes an arcuate portion 160 extending from the semi-cylindrical portions 140 to the side wall 156. The arcuate portion 160 of the support member 68 acts as a clamping member along with the arcuate portion 150 of the clamping member 144 to clamp the jacket tube 58 and prevent movement of the steering column member 12 relative to the steering column member 14.

Figure 5:
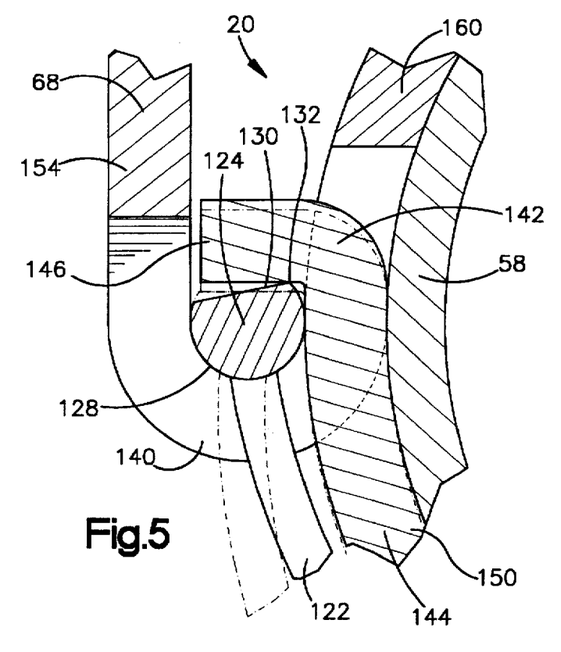
FIG. 5 is an enlarged view of a portion of the steering column of FIG. 4.

When the edge 132 of the cam 122 engages the lip 146 of the clamping member 144, as shown in solid lines in FIG. 5, the jacket tube 58 is clamped between the arcuate portion 150 of the clamping member 144 and the arcuate portion 160 of the support 68. Upon rotation of the cam 122 about the axis of the portion 124 to the position shown in dot-dash lines in FIG. 5, the flat side wall 130 of the portion 124 comes into engagement with the lip 146. The clamping member 144 pivots relative to the support 68 and the arcuate portion 150 of the clamping member 144 moves radially outwardly to the position shown in dot-dash lines in FIG. 5 to release the jacket tube 58. Accordingly, the steering column member 12 can be moved axially relative to the steering column member 14.

Figure 6:
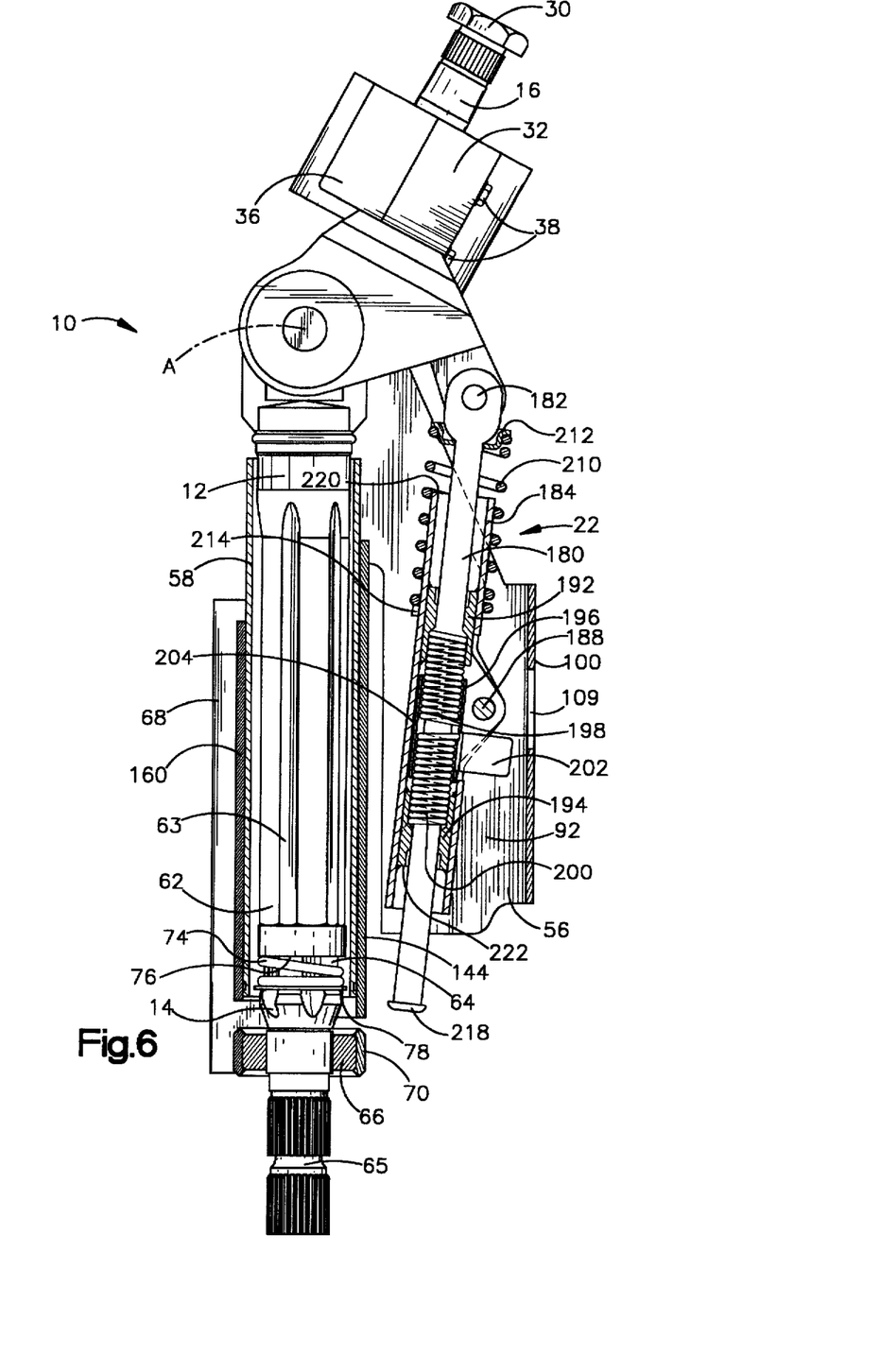
FIG. 6 is a sectional view taken along the line 6—6 of FIG. 3, showing a tilt-locking mechanism of the steering column.

A tilt-lock bar 180 (FIGS. 1 and 6) is pivotally connected to the upper housing 32 by a pin 182. The tilt-lock bar 180 extends through a tubular member 184 (FIG. 6). The tubular member 184 is pivotally connected between one of the side walls 92 of the bracket 56 and a flange 186 (FIG. 3) of the bracket by a pin 188.

A pair of bushings 192 and 194 (FIG. 6) are located within the tubular member 184. The bushings 192 and 194 are connected to the tubular member 184 and support the tilt-lock bar 180 for axial movement relative to the tubular member. The bushings 192 and 194 are located on either side of a lever 196. A coil spring 198 is connected at one end to the bushing 192 and at its other end to the lever 196. Another coil spring 200 is connected at one end to the bushing 194 and at its other end to the lever 196. The springs 198 and 200 are normally tightly wound on the periphery of the tilt-lock bar 180 so that, when fully wound, they grip the tilt-lock bar to prevent relative movement between the tilt-lock bar and the tubular member 184. Rotation of the lever 196 about the axis of the tilt-lock bar 180 causes the springs 198 and 200 to become partially unwound and release their grip on the tilt-lock bar 180.

Figure 3:
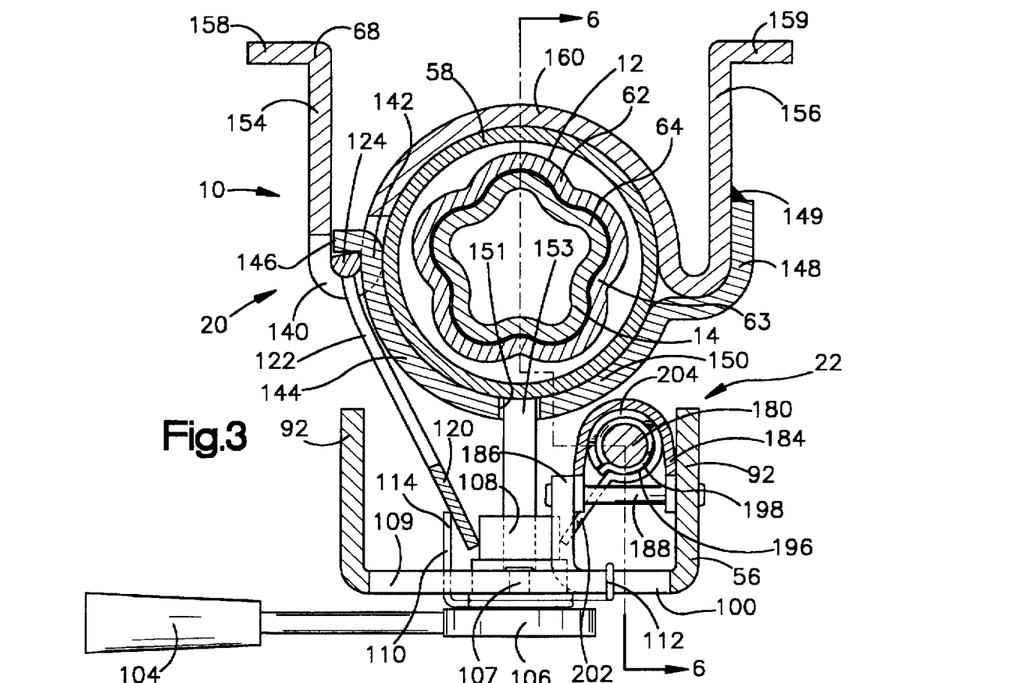
FIG. 3 is another sectional view of the steering column of FIG. 1, showing a telescope locking mechanism of the steering column in a locked position.

The lever 196 has a control extension 202 engaging the portion 108 of the actuator member 106, see FIG. 3, and integral with a cylindrical body portion 204 (FIG. 6). The body portion 204 extends around portions of the springs 198 and 200. An inner end of each of the springs 198 and 200 is retained between an edge of the body portion 204 and the control extension 202 to fix the inner end of each of the springs to the lever 196. Outer ends of the springs 198 and 200 are fixed within the bushings 192 and 194, respectively, and thus, to the tubular member 184. Thus, when the lever 196 is rotated about the tilt-lock bar 180, the outer ends of the springs 198 and 200 can not be moved about the axis of the tilt-lock bar 180 and the force imparted to the springs by the lever 196 causes the springs to unwind.

A tilt spring 210 extends between a spring retainer flange 212 on the tilt-lock bar 180 and a flange 214 located on the tubular member 184. The tilt spring 210 biases the input shaft 16 to pivot in a counterclockwise direction, as viewed in FIG. 6, relative to the steering column member 12. The spring retainer flange 212 defines an extreme clockwise pivot position of the input shaft 16. When the spring retainer flange 212 of the tilt-lock bar 180 engages an upper surface 220 of the tubular member 184, the input shaft 16 is in the extreme clockwise pivot position. A lower flange 218 of the tilt-lock bar 180 can be received in the tubular member 184 and defines an extreme counterclockwise pivot position of the input shaft 16. When the flange 218 of the tilt-lock bar 180 engages a lower surface 222 of the bushing 194, the input shaft 16 is in the extreme counterclockwise pivot position.

The portion 108 of the actuator member 106 that extends into the opening 109 in the bracket 56 engages the paddle portion 120 of the cam 122 and the lever 196. Upon pivoting the handle 104 and the actuator member 106 in one direction, the actuator member moves the paddle portion 120 of the cam 122 to release the telescope locking mechanism 20. Upon pivoting the handle 104 and the actuator member 106 in another direction, the actuator member moves the lever 196 to unlock the tilt-locking mechanism 22.

Figure 4:
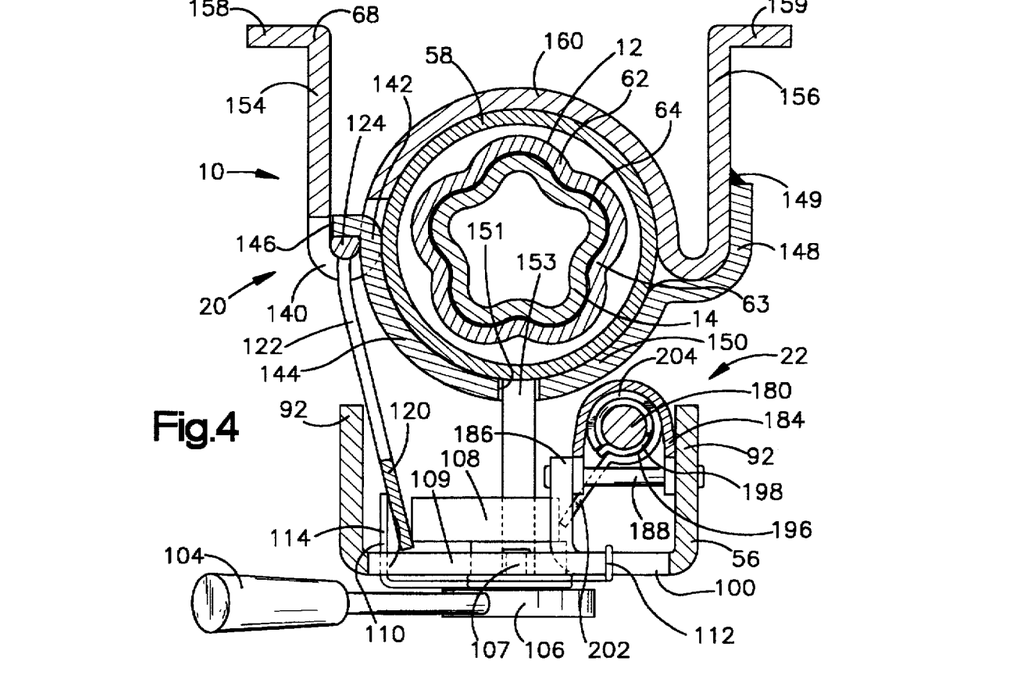
FIG. 4 is a sectional view, generally similar to FIG. 3, showing the telescope locking mechanism of the steering column in an unlocked position.

Upon pivoting of the handle 104 and the actuator member 106 so that the portion 108 moves towards the paddle portion 120 of the cam 122, the cam pivots about the axis of the portion 124. Upon pivotal movement of the cam 122, the flat side wall 130 comes into engagement with the lip portion 146 of the clamping member 144, as seen in FIG. 4. Clamping member 144 and the support 68 release the jacket tube 58 and the steering column member 12 can be moved axially, telescoped, relative to the steering column member 14. Upon release of the handle 104, the spring 110 causes the cam 122 to pivot so that the edge 132 of the portion 124 engages the lip 146 of the clamping member 144, as seen in FIG. 3. The spring 110 also causes the handle 104 and the actuator member 106 to move to their initial positions. Accordingly, the steering column member 12 is locked in its axial position relative to the steering column member 14.

Upon pivoting of the handle 104 and the actuator member 106 so that the portion 108 of the actuator member moves towards the lever 196, the springs 198 and 200 are unwound to allow the tilt lock bar 180 to move relative to the tubular member 184. Therefore, the input shaft 16 can pivot relative to the steering column member 12. Upon release of the handle 104 and the actuator member 106 after the input shaft 16 has been pivotally positioned relative to the steering column member 12, the springs 198 and 200 cause the lever 196 to move the handle 104 and the actuator member 106 to their initial positions.

When the tilt locking mechanism 22 is released, the tilt lock bar 180 is movable relative to the tubular member 184 and the bracket 56 to position the input shaft 16 in any one of an infinite number of pivot positions. While adjusting the pivot position of the input shaft 16, the tilt lock bar 180 pivots relative to the upper housing 32 and the tilt lock bar and the tubular member 184 pivot together relative to the bracket 56.

In the embodiment of the invention illustrated in FIGS. 1-6, the camming portion 124 of the cam 122 has an arcuate side surface 128 and a flat side wall 130. In the embodiment of the invention illustrated in FIG. 7, the camming portion of the cam has a generally rectangular cross-sectional configuration. Since the embodiment of the invention illustrated in FIG. 7 is generally similar to the embodiment of the invention illustrated in FIGS. 1-6, similar numerals will be utilized to designate similar components, the suffix letter "a" being associated with the numerals of FIG. 7 to avoid confusion.

A cam 122a of a telescope locking mechanism 20a includes a longitudinally extending camming portion 250. The camming portion 250 of the cam 122a has a generally rectangular cross-section. The camming portion 250 has side surfaces 252 and 254 extending generally parallel to each other. The camming portion 250 also includes side surfaces 256 and 258 extending generally parallel to each other and intersecting surfaces 252 and 254. The side surfaces 256 and 254 intersect to form a longitudinally extending edge 260. Surfaces 252 and 258 intersect to define a longitudinally extending edge 262.

The portion 250 of the cam 122a engages rectangular portions 268 of a support 68a connectable to a vehicle frame. The portion 250 also engages an end portion 142a of a clamping member 144a so that the portion 250 of the cam 122a acts between portions 268 of the support 68a and the end portion 142a of the clamping member 144a. The end portion 142a of the clamping member 144a has a radially extending lip 146a which engages the portion 250 of the cam 122a. The clamping member 144a has another end portion (not shown) which is pivotally connected to the support 68a. The clamping member 144a includes an arcuate portion 158a extending between the end portions of the clamping member.

Figure 7:
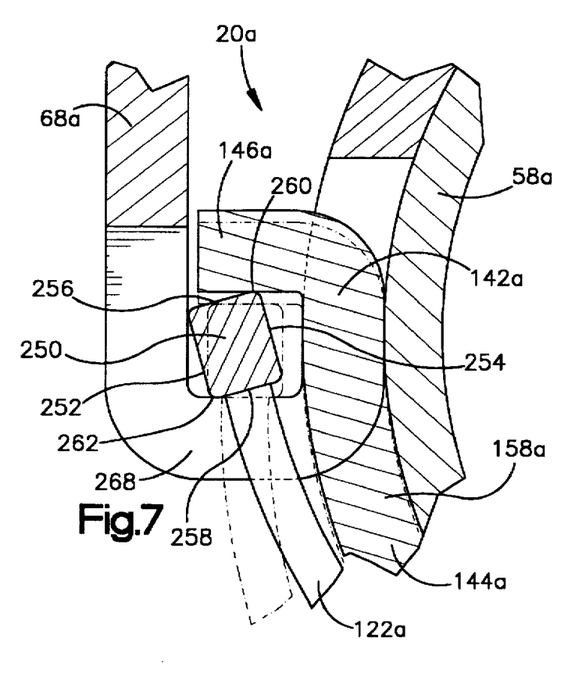
FIG. 7 is an enlarged sectional view, generally similar to FIG. 5, showing a second embodiment of a cam.

When the edge 260 of the cam 122a engages the lip 146a and the edge 262 engages the portion 268 of the support 68a, as shown in solid lines in FIG. 7, a jacket tube 58a connected to a steering column member (not shown) is clamped between the clamping member 144a and the support 68a. The steering column member cannot move axially relative to another steering column member (not shown) rotatably supported on the support 68a.

Upon rotation of the cam 122a about an axis of the portion 250, the side surface 256 comes into engagement with the lip 146a of the clamping member 144a and the side surface 258 comes into engagement with the portion 268 of the support 68a, as shown in dot-dash lines in FIG. 7. The arcuate portion 158a of the clamping member 144a moves radially outwardly to release the jacket tube 58a. Accordingly, the steering column member can be moved axially relative to the other steering column member.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:

first and second coaxial steering column members, said first steering column member being axially movable relative to said second steering column member;

an axially extending member connected to said first steering column member and movable with said first steering column member relative to said second steering column member;

support means for connecting said steering column to a vehicle frame, said support means including first and second clamping members at least partially circumscribing said axially extending member connected to said first steering column member for clamping said member connected to said first steering column member to lock said first steering column member in any one of an infinite number of axial positions relative to said second steering column member, said first clamping member being adapted to be connected to the vehicle frame, said second clamping member having a first end portion connected to said first clamping member and a second end portion; and a cam engaging said second end portion of said second clamping member for applying a clamping force to said second clamping member, said cam having a first position in which said first and second clamping members clamp said axially extending member connected to said first steering column member to prevent movement of said first steering column member relative to said second steering column member and a second position in which said first and second clamping members release said axially extending member connected to said first steering column member to permit axial movement of said first steering column member relative to said second steering column member.

2. A steering column as set forth in claim 1 wherein said first clamping member supports said second steering column member for rotation about a longitudinal axis of said second steering column member.

3. A steering column as set forth in claim 1 wherein said cam engages a portion of said first clamping member.

4. A steering column as set forth in claim 3 wherein said cam moves said second end portion of said second clamping member away from said portion of said first clamping member as said cam moves from its second position to its first position.

5. A steering column as set forth in claim 4 wherein said cam includes a longitudinally extending portion with an arcuate side surface and a generally flat side wall, said arcuate side surface and said flat side wall defining an edge at an intersection of said arcuate side surface and said flat side wall, said edge engaging said second end portion of said second clamping member when said cam is in its first position, said flat side wall engaging said second end portion of said second clamping member when said cam is in its second position.

6. A steering column as set forth in claim 5 wherein said longitudinally extending portion of said cam extends parallel to a longitudinal axis of said second steering column member.

7. A steering column as set forth in claim 1 further including means for biasing said cam into its first position.

8. A steering column as set forth in claim 7 further including an actuator member for moving said cam from its first position to its second position, said actuator member having a first position in which said cam is in its first position and a second position in which said cam is in its second position, said actuator member being movable with said first steering column member relative to said second steering column member and said cam, said biasing means biasing said actuator member to its first position.

9. A steering column as set forth in claim 8 wherein said biasing means comprises a torsion spring wrapped around a portion of said actuator member, said torsion spring including a portion engaging said cam.

10. A steering column as set forth in claim 8 wherein said cam includes a paddle portion extending generally parallel to a longitudinal axis of said second steering column member and engaging said actuator member.

11. A steering column as set forth in claim 1 wherein said axially extending member connected to said first steering column member comprises a jacket tube circumscribing said first steering column member.

12. A steering column as set forth in claim 11 wherein said second clamping member includes first and second surfaces engageable with a projection connected to said jacket tube to define limits of axial movement of said first steering column member relative to said second steering column member.

13. A steering column as set forth in claim 1 further including an input shaft connectable with a steering wheel and supported on said first steering column member for pivotal movement relative to said first steering column member about an axis extending transverse to the direction of relative movement between said first and second steering column members and tilt locking means for locking said input shaft in any one of a plurality of pivot positions relative to said first steering column member.

14. A steering column as set forth in claim 13 wherein said tilt locking means includes means for locking said input shaft in any one of an infinite number of pivot positions relative to said first steering column member.

15. A steering column as set forth in claim 14 further including an actuator member for moving said cam from its first position to its second position and for unlocking said tilt locking means, said actuator member having a first position in which said cam is in its first position and said tilt locking means is locked, a second position in which said cam is in its second position and said tilt locking means is locked, and a third position in which said tilt locking means is unlocked and said cam is in its first position.

16. A steering column as set forth in claim 15 further including means biasing said actuator member into its first position.

17. A steering column comprising:

first and second coaxial steering column members, said first steering column member being axially movable relative to said second steering column member;

an axially extending member connected to said first steering column member and movable with said first steering column member relative to said second steering column member;

support means for connecting said steering column to a vehicle frame, said support means including means for clamping said axially extending member connected to said first steering column member to lock said first steering column member in any one of an infinite number of positions relative to said second steering column member, said clamping means at least partially circumscribing said member connected to said first steering column member;

a cam for applying a clamping force to said clamping means, said cam having a first position in which said clamping means clamps said member connected to said first steering column member to prevent movement of said first steering column member relative to said second steering column member and a second position in which said clamping means releases said axially extending member to permit movement of said first steering column member relative to said second steering column member; and an actuator member engageable with said cam for moving said cam from its first position to its second position, said actuator member having a first position in which said cam is in its first position and a second position in which said cam is in its second position, said actuator member being movable with said first steering column member relative to said second steering column member and said cam.

18. A steering column as set forth in claim 17 wherein said clamping means comprises first and second clamping members at least partially circumscribing said member connected to said first steering column member.

19. A steering column as set forth in claim 18 wherein said first clamping member is adapted to be connected to the vehicle frame, said second clamping member having a first end portion connected to said first clamping member and a second end portion engaging said cam.

20. A steering column as set forth in claim 19 wherein said first clamping member supports said second steering column member for rotation about a longitudinal axis of said second steering column member.

21. A steering column as set forth in claim 19 wherein said cam engages a portion of said first clamping member.

22. A steering column as set forth in claim 21 wherein said cam moves said second end portion of said second clamping member away from said portion of said first clamping member as said cam moves from its second position to its first position.

23. A steering column as set forth in claim 17 further including means for biasing said cam into its first position, said biasing means also biasing said actuator member into its first position.

24. A steering column as set forth in claim 23 wherein said cam includes a paddle portion extending generally parallel to the longitudinal axis of said second steering column member, said biasing means comprising spring means extending between said paddle portion of said cam and said actuator member, said spring being movable along said paddle portion of said cam during movement of said first steering column member relative to said second steering column member.

25. A steering column as set forth in claim 24 wherein said spring comprises a torsion spring wrapped around a portion of said actuator member.

26. A steering column as set forth in claim 17 wherein said axially extending member connected to said first steering column member comprises a jacket tube circumscribing said first steering column member.

27. A steering column as set forth in claim 17 further including an input shaft connectable with a steering wheel and supported on said first steering column member for pivotal movement relative to said first steering column member about an axis extending transverse to the direction of relative movement between said first and second steering column members and tilt locking means for locking said input shaft in any one of an infinite number of pivot positions relative to said first steering column member, said tilt locking means being locked when said actuator member is in its first position.

28. A steering column as set forth in claim 27 wherein said actuator member has a third position in which said tilt locking means is unlocked and said cam is in its first position, said tilt locking means being locked when said actuator member is in its second position.

29. A steering column as set forth in claim 28 further including means biasing said actuator member into its first position.

* * * * *